UNITED STATES PATENT OFFICE.

SEBASTIAN LOMANITZ, OF MERIDA, MEXICO, ASSIGNOR OF TWENTY-FIVE ONE-HUNDREDTHS TO JOSEPH JOFFE, OF NEW YORK, N. Y.

VEGETABLE DRYING-OIL.

1,244,521. Specification of Letters Patent. Patented Oct. 30, 1917.

No Drawing. Application filed February 17, 1916. Serial No. 78,839.

*To all whom it may concern:*

Be it known that I, SEBASTIAN LOMANITZ, a citizen of the United States, a resident of Merida, Province of Yucatan, Mexico, have discovered a new and industrially useful Vegetable Drying-Oil, of which the following is a specification.

This discovery relates to an oil of vegetable origin, not derived from linseed but having substantially all the properties of linseed oil and the drying qualities of which even exceed that of linseed oil. The object of this discovery is to provide a new product of manufacture forming a substitute for linseed oil, which new oil could be derived from its source at less expense and with a greater yield than it is possible to obtain oil from linseed.

A further object of the discovery is to utilize the residue left by the seed from which the oil is extracted, as a forage or cattle food.

The drying qualities of linseed oil are well known and it is the only drying oil which is of commercial importance and usually considerably adulterated with semi-drying oils, diluents, etc., to reduce the price of the product. A number of substitutes have been placed on the market which contain as a part thereof the linseed oil, but all those substitutes show objectionable properties and fail in their drying qualities, and do not answer the purpose for which the linseed oil can be used.

I have discovered that a plant chia, belonging to the genus *Salvia* and known as *Salvia hispanica* of the *Labiatiœ* family yields a seed the oil of which has all the good properties of linseed oil, even the odor. The seeds of chia are used for the preparation of a beverage which is sold publicly in the streets of Mexico. There are a number of varieties of such seeds.

The chia plant is a shrub that reaches about 5 to 6 feet in height, the seeds are oval shaped, about 1 mm. in the longest diameter and about ½ mm. in the shortest diameter. The yield per hectar varies between 4,000 kg. to 1,000 kg. and in certain parts of the county two crops a year may be obtained.

It is remarkable that in all classic books on vegetable oils, such as Lewkowitsch, Chershefsky, Beilstein and Abderhalden, there is no mention whatever that oil can be derived from this species.

Experiments performed with seven varieties of seed gave the following results. Average wt. of 1,000 seeds 1,166 gr., moisture average 7.33%, oil average in seed 32%.

It will be remarked that the yield of oil from chia seeds exceeds the yield of oil from linseed. The test of oil obtained from seeds coming from different parts of the country gave the following data:

| | |
|---|---|
| Sp. gr. 15.5/15.5 | 0.9341 |
| F. F. A. (as oleic) | 1.45 |
| Index of refraction $nD$ 40° C | 1.4757 |
| Index of refraction $nD$ 17.5° C | 1.48354 |
| Reichert-Meissl No | 0.1 |
| Iodin value | 187.59 |
| Hehner value | 94.16 |
| Ester value | 187.49 |

The oil remains fluid at low temperatures, similarly to linseed oil.

The residue left after the extraction of the oil was found to contain substantially 30% protein.

Particular attention is called to the specific gravity of the oil, to the index of refraction, the iodin value and the Reichert-Meissl value, and also the fluidity at temperatures below normal, all indicating the close relation in drying qualities between this vegetable oil and that derived from linseed. The iodin value which is the index of the drying qualities of the oil is substantially that of the best linseed oils.

While it is only possible to derive 29% of oil from linseed it is possible to derive about 33% of oil from seeds of chia, the method of extraction being in no way more difficult than that of linseed oil, the great yield of oil from chia seeds, and the value of the residue reduce considerably the price of the finished product. In view of the fact that two crops a year may be obtained it is natural that the oil could be manufactured at a price considerably lower than the linseed oil.

I claim

1. As a new article of manufacture an oil derived from seeds of a plant of the genus Salvia, family Labiatiœ.

2. As a new article of manufacture an oil derived from seeds of *Salvia hispanica* commonly known as chia.

3. As a new article of manufacture an oil derived from the seeds of the plant chia and having an iodin value of substantially 187.6.

4. As a new article of manufacture a vegetable oil derived from seeds of the chia plant and characterized by an index of refraction $n$D 40° C. of substantially 1.4757, and an index of refraction $n$D 17.5° C. of substantially 1.48354.

5. As a new article of manufacture an oil derived from the seeds of the plant chia and having a specific gravity of substantially .9341, at substantially 15.5/15.5.

6. As a new article of manufacture a vegetable oil having a specific gravity of substantially .9341, index of refraction $n$D 40° C., substantially 1.4757, and $n$D 17.5° C., substantially 1.48354, and it is characterized by iodin value of substantially 187.59, and Reichert-Meissl No. 0.1.

7. As a new article of manufacture a product from the process of obtaining oil from the chia plant consisting of a residue forming a cattle food.

SEBASTIAN LOMANITZ.

Witnesses:
JOSEPH JOFFRE,
H. H. FELDSTEIN.